United States Patent
Li et al.

(10) Patent No.: US 7,347,604 B2
(45) Date of Patent: Mar. 25, 2008

(54) LED LANTERN STRUCTURE

(75) Inventors: Hung-Chun Li, Pingtung Hsien (TW);
Li-Ling Lee, Hsinchu Hsien (TW);
Wen-Lune Wu, Changhua Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 144 days.

(21) Appl. No.: 11/315,261

(22) Filed: Dec. 23, 2005

(65) Prior Publication Data

US 2006/0146559 A1 Jul. 6, 2006

(30) Foreign Application Priority Data

Dec. 31, 2004 (TW) .............................. 93141801 A

(51) Int. Cl.
*F21V 7/04* (2006.01)
(52) U.S. Cl. ...................................... 362/555; 362/511

(58) Field of Classification Search ................ 362/511, 362/555
See application file for complete search history.

(56) References Cited

U.S. PATENT DOCUMENTS

| 6,527,411 B1* | 3/2003 | Sayers .......................... 362/245 |
| 6,991,355 B1* | 1/2006 | Coushaine et al. .......... 362/555 |
| 7,086,765 B2* | 8/2006 | Wehner ....................... 362/511 |

* cited by examiner

*Primary Examiner*—Sandra O'Shea
*Assistant Examiner*—James W Cranson

(57) ABSTRACT

A lantern structure comprising a base, at least one luminous body, at least one light pipe and a lantern cover, wherein the light source of the luminous body is the LED. The luminous body is disposed on a surface of the base, and the base and the luminous body are enclosed under the lantern cover. The light pipe connects the luminous body to the lantern cover in order to guide the light radiated from the luminous body to a desired irradiating area.

15 Claims, 2 Drawing Sheets

LED LANTERN STRUCTURE

RELATED APPLICATIONS

The present application is based on, and claims priority from, Taiwan Application Serial Number 93141801, filed Dec. 31, 2004, the disclosure of which is hereby incorporated by reference herein in its entirety.

BACKGROUND

1. Field of Invention

The present invention relates to a lantern structure. More particularly, the present invention relates to a lantern structure that uses the light emitting diode (LED) as the light source.

2. Description of Related Art

There are many lamplight applications on a vehicle, such as headlights, turn signals, reverse lights and taillights. The lamps and lanterns on the vehicle must not only be pleasing to the eye but also must fulfill the more important purposes of lighting and warning, such that the safety of passengers and pedestrians can be maintained. Vehicle lamplight requirements have become more and more stringent with the progress of the automobile industry.

Light bulbs, such as halogen light bulbs, are the most general and typical light source used in the lanterns of vehicles. Because the purpose of light bulbs is only to radiate light, and the light radiated from the light bulbs does not allow for much variation with respect to the irradiating scope and the light color, the light bulb design is not flexible. Several disadvantages in using light bulbs have gradually become apparent with the introduction of newer lighting technologies. For example, the light bulb consumes more power and generates more heat than newer lighting technologies, raising the power consumption of the vehicle and thus degrading power efficiency. In addition, the higher brightness light bulb or the fluorescent tube may seriously pollute the environment because it contains hazardous materials such as mercury. Moreover, the casing of the light bulb and fluorescent tube is made of glass, which is easily damaged by a violent shaking or impact, drastically reducing the lifetime of the lights.

Many of these drawbacks are overcome by the light emitting diode (LED); the LED has a smaller volume, a lower power consumption, a lower heat generation and many available colors (wavelengths) of light that can be chosen. Thus, the LED has become increasingly more popular in vehicle lantern applications. However, the luminous intensity of the LED is lower than the light bulb under the same power consumption; therefore, how to effectively make good use of the light radiated from the LED is very important.

FIG. 1 shows an LED lantern structure for a vehicle. The vehicular lantern comprises many luminous bodies in general, such as the luminous bodies 102 and 104. Both the luminous bodies 102 and 104 comprise an LED 106, a condensing lens 108 surrounding the LED 106 and a transparent radiating cover 110. The LED 106 is used to act as the light source for the whole vehicular lantern. The condensing lens 108 is used to gather the light dispersed from the LED 106 and focus it on a lantern cover 118. The radiating cover is used to protect the LED 106.

In practice, the vehicular lantern must sometimes achieve pantoscopic irradiating, that is to say, the light must not only be radiated straight out from the surface of the vehicular lantern but also must be dispersed for burdening the irradiating scope of the vehicular lantern in order to bring more attention to pedestrians and other vehicles. Therefore, the luminous bodies 102 and 104 in the vehicular lantern shown in FIG. 1 are arranged as a stair-shape for burdening the irradiating scope of the vehicular lantern.

The foregoing vehicular lantern structure still has some problems. The material of the lantern cover 118 exhibits some reflectivity in general; therefore, a part of the light 112 radiated from the luminous bodies 102 and 104, such as a light 114, will be reflected back into the inside of the vehicular lantern when the light 112 passes through the lantern cover 118. Because the light 112 is naturally scattered, the brightness of the vehicular lantern is somewhat reduced, and furthermore, the light 114 is reflected back into the inside of the vehicular lantern, further reducing the brightness. In another aspect, although the stair-shape lantern structure can increase the irradiating scope and angle of the light, the volume of the whole lantern will be relatively increased, too. Moreover, further loss of light occurs because a part of the light radiated from the luminous body 104, such as a light 116, is obstructed by the luminous body 102. In addition, the design of the lantern structure is not flexible because the number of bright points is bound to the number of luminous bodies in the lantern structure. Thus, the number of luminous bodies cannot be easily reduced.

According to the foregoing shortcomings, a more economical and more efficient vehicular LED lantern structure is needed.

SUMMARY

It is therefore an objective of the present invention to provide a vehicular lantern that is easily integrated with the conventional LED light source.

It is another objective of the present invention to provide a vehicular lantern that has more flexibility in design.

It is still another objective of the present invention to provide a vehicular lantern that uses less light sources.

It is another objective of the present invention to provide a vehicular lantern that has a low light loss.

In accordance with the foregoing and other objectives of the present invention, the vehicular lantern comprises a base, a lantern cover, at least one luminous body comprising an LED and at least one light pipe structure in an embodiment of the present invention. Each luminous body corresponds to one light pipe that is able to guide the light radiated from the luminous body to a predetermined irradiating location and then radiate the light out through the lantern cover. Thus, the loss of the light can be reduced during the propagation of the light, and the brightness and the scope of each bright point on the lantern can be controlled by the diameter of the light pipe.

In another embodiment of the present invention, a luminous body can correspond to two or more light pipes in order to increase the number of bright points on the lantern without increasing the number of luminous bodies.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
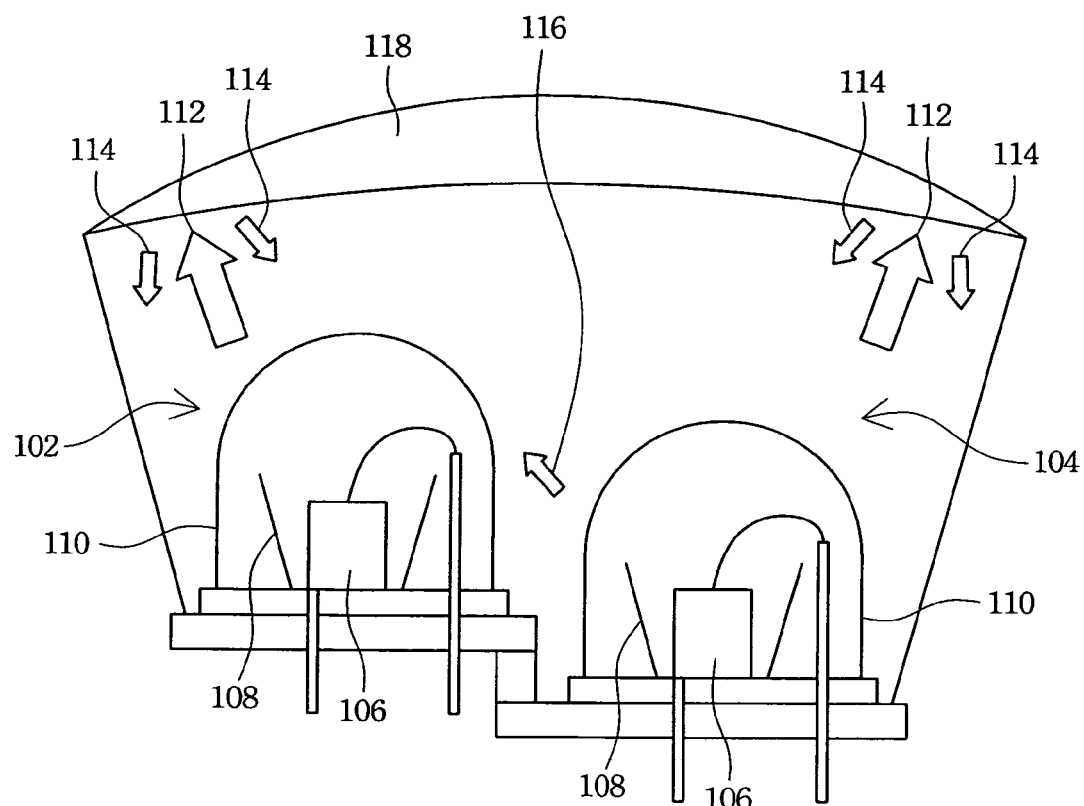
FIG. 1 illustrates a conventional structure of an LED lantern.

Reference will now be made in detail to the present preferred embodiments of the invention, examples of which are illustrated in the accompanying drawings. Wherever possible, the same reference numbers are used in the drawings and the description to refer to the same or like parts.

The basic concept of the present invention is to guide the light in an LED lantern out of the lantern by piping in order to avoid the scatter and loss of the light in the lantern.

Figure 2:
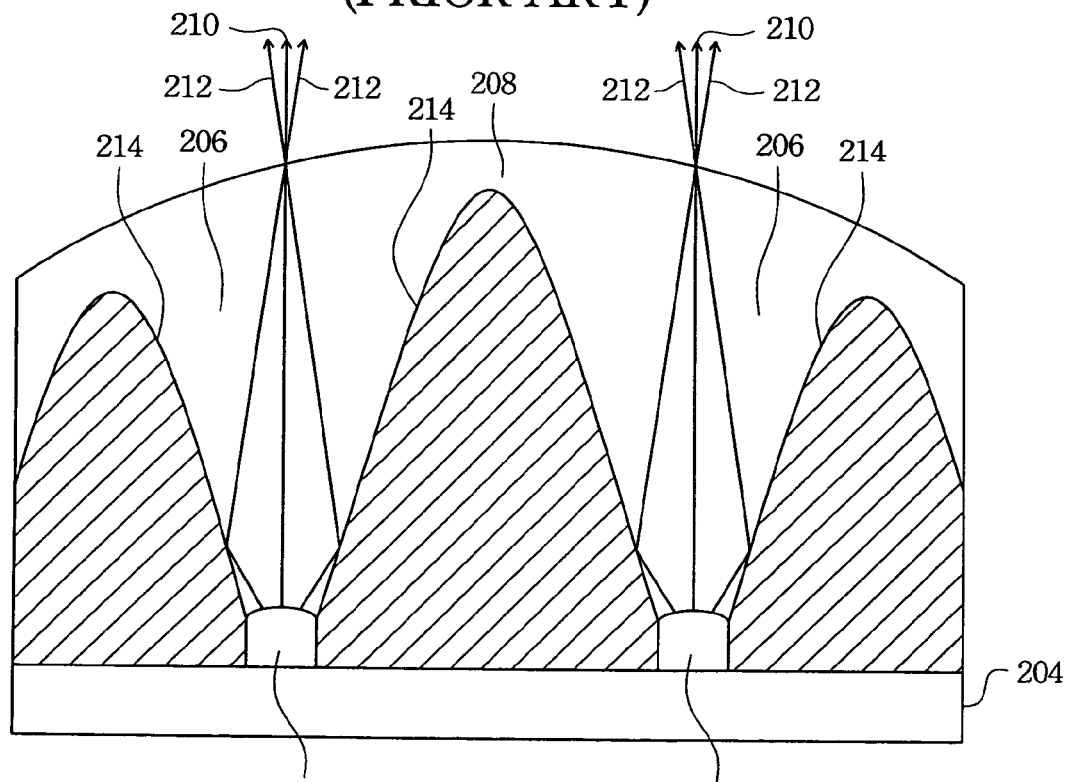
FIG. 2 illustrates a cross-sectional view of the structure of an LED lantern in accordance with an embodiment of the present invention.

FIG. 2 shows a cross-sectional view of a vehicular lantern in accordance with an embodiment of the present invention. The components of the vehicular lantern are at least one luminous body 202 used to be a light source, a base 204 used to support the luminous body 202 and a lantern cover 208 used to cover the whole lantern, wherein the light provided by the luminous body 202 is from an LED, and the base 204 is a circuit board which is able to provide the power needed by the luminous body 202. Two luminous bodies 202 are exemplified to be the light source in FIG. 2, but the number of luminous bodies is not limited by the embodiment in practice. It can be seen that the vehicular lantern also comprises a light pipe 206 for each luminous body 202 extending from the internal surface of the lantern cover 208 to the luminous body 202. Each luminous body 202 is surrounded by one light pipe 206 for gathering the light radiated from the luminous bodies 202.

As implied by the name, the purpose of the light pipes 206 is to form a propagating pathway for guiding the light. As FIG. 2 shows, the light radiated from the luminous bodies 202 is gathered by the light pipes 206 and is propagated and reflected in the light pipes 206. In the structure, the light 210 is directly radiated outward through the light pipe 206 and the lantern cover 208, and the oblique light 212 is reflected along a pipe wall 214 of the light pipe 206 and then radiated toward the direction of the opening of the light pipe 206. Thus, the light radiated from this kind of vehicular lantern is more concentrated and is brighter.

The lantern cover 208 and the light pipe 206 shown in FIG. 2 are formed as one piece from any medium for lighting applications, such as resin. Furthermore, since light is reflected on a pipe wall 214 of the light pipe 206, a material which is able to effectively reflect the light, such as metal or glass, may be coated on the pipe wall 214, or the total reflection theorem of light can be exploited to engineer the reflection of the light within the light pipe 206.

Figure 3:
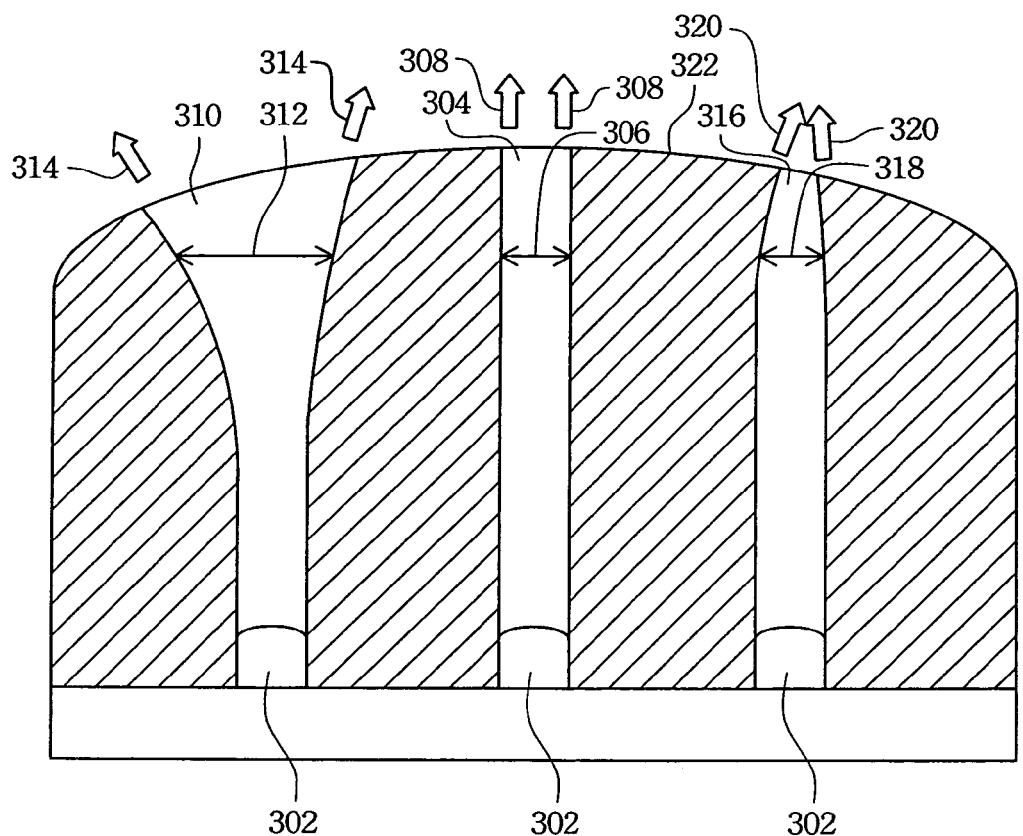
FIG. 3 illustrates a cross-sectional view of the structure of an LED lantern in accordance with another embodiment of the present invention.

FIG. 3 shows a vehicular lantern according to another embodiment of the present invention. Light pipes 304, 310 and 316 have the same material and purpose with the light pipe 206 shown in FIG. 2, but they and a lantern 322 of the lantern may be formed separately. An end of the light pipes 304, 310 and 316 is connected to the lantern cover 322, and the other end surrounds a luminous body 302 for gathering the light radiated from the luminous body 302. The material of the light pipes 304, 310 and 316 is also any medium for lighting applications, such as resin, and the reflective material may also be coated on the pipe walls of the light pipes 304, 310 and 316.

The light pipes 304, 310 and 316 have three different diameters 306, 312 and 318 for different irradiation purposes. The diameter 306 of the light pipe 304 maintains a constant size; therefore, the light radiated from the luminous body 302 is guided by the light pipe 304 as a straight light 308. Hence, a bright point with a normal brightness and scope is seen. The diameter 312 of the light pipe 310 gradually expands from the bottom to the top; therefore, the light radiated from the luminous body 302 is guided by the light pipe 310 as a dispersive light 314. Hence, a bright point with a lower brightness and a larger scope is seen. The diameter 318 of the light pipe 316 gradually shrinks from the bottom to the top; therefore, the light radiated from the luminous body 302 is guided by the light pipe 316 as a spot light 320. Hence, a bright point with a higher brightness and a smaller scope is seen.

According to the three kinds of light pipe structure in the foregoing description, the size of the diameter determines the irradiating scope and brightness. Therefore, before a vehicular lantern is designed, the purpose of the lantern must be ascertained first, and then an appropriate diameter for the light pipe can be chosen. For example, because a turn signal may not need a high brightness but needs a larger irradiating scope for attracting the attention of other vehicles and passersby, a light pipe having a larger diameter can be used in the turn signal.

Figure 4:
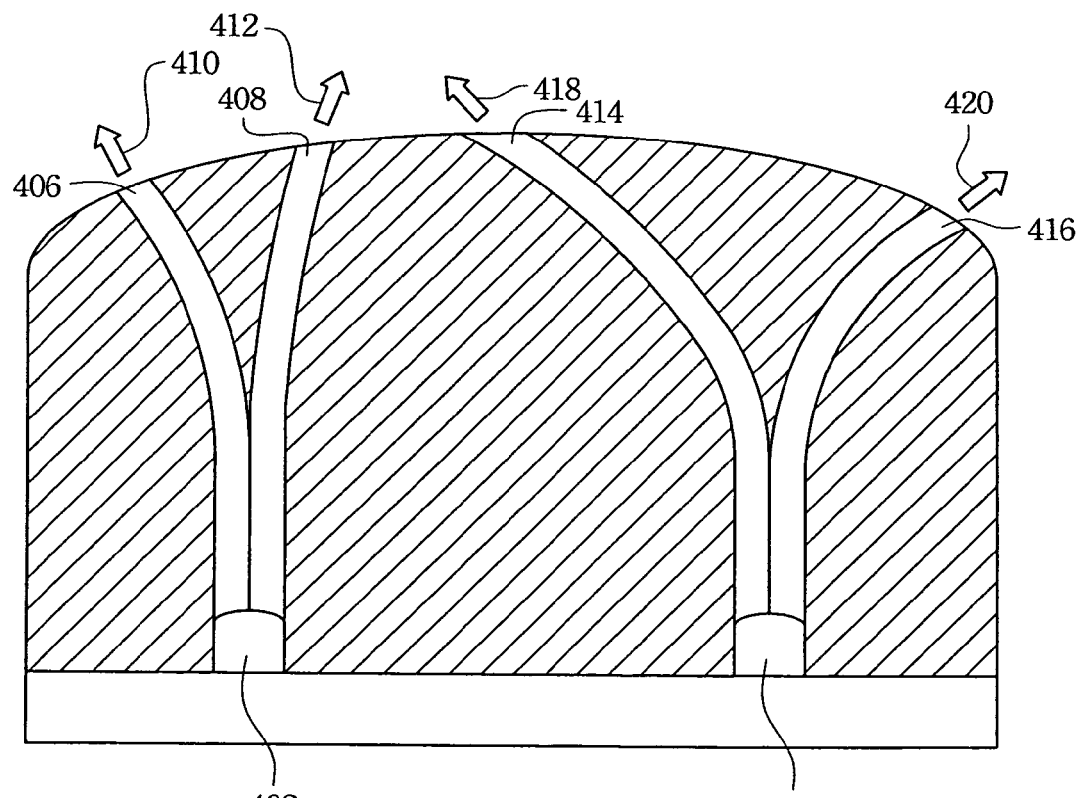
FIG. 4 illustrates a cross-sectional view of the structure of an LED lantern in accordance with yet another embodiment of the present invention.

FIG. 4 shows a vehicular lantern according to yet another embodiment of the present invention, which is able to offer more bright points using less luminous bodies and still control the irradiating scope. The lantern structure shown in FIG. 4 is approximate to the lantern structure shown in FIG. 3; the only difference is that every luminous body corresponds to a plurality of light pipes, such as with the light pipes 406 and 408 corresponding to a luminous body 402 and light pipes 414 and 416 corresponding to a luminous body 404. In this embodiment, one luminous body corresponds to two light pipes, but the number of light pipes corresponding to a luminous body is not limited in practice.

It can be seen that a part of the light radiated from the luminous body 402 is guided by the light pipe 406 as light 410, and another part of the light radiated from the luminous body 402 is guided by the light pipe 408 as light 412. Similarly, the light radiated from the luminous body 404 is respectively guided by light pipes 414 and 416 as lights 418 and 420. In a word, the number of luminous bodies is reduced by using two luminous bodies to irradiate four bright points in this embodiment.

In addition, to regulate the irradiating scope of a lantern, every bright point can be placed at an appropriate location on the lantern by arranging the paths of the light pipes. For example, the light pipes 406, 408, 414 and 416 shown in FIG. 4 are all appropriately curved to radiate lights 410, 412, 418 and 420 toward different directions to control the irradiating scope of the lantern.

Although the vehicular lanterns mentioned in the foregoing description are used to be the embodiments of the present invention, other analogous lanterns may be implemented according to the present invention, such as a streetlamp or a traffic light.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A lantern using light emitting diode (LED) light, comprising:
    a base;
    a luminous body disposed on a surface of said base, wherein said luminous body comprises at least one LED;
    a lantern cover, wherein said lantern cover covers said base and said luminous body; and
    at least two light pipes, wherein said two light pipes connect said luminous body to said lantern cover,
    wherein the light radiated from said luminous body is guided by said two light pipes to two locations on said lantern cover.

2. The lantern of claim 1, wherein said base is a circuit board used to provide a power to said luminous body.

3. The lantern of claim 1, wherein the material of said light pipe is resin.

4. The lantern of claim 1, wherein said light pipe has a constant diameter.

5. The lantern of claim 1, wherein the diameter of the two ends of said light pipe are different.

6. The lantern of claim 1, wherein the path of said light pipe is curved.

7. The lantern of claim 1, wherein said light pipe and said lantern cover are formed as one piece.

8. The lantern of claim 1, wherein said lantern is a vehicular lantern.

9. A vehicular lantern using light emitting diode (LED) light, comprising:
    a base;
    a plurality of luminous bodies disposed on a surface of said base, wherein each of said luminous bodies comprises at least one LED;
    a lantern cover, wherein said lantern cover covers said base and said luminous bodies; and
    a plurality of light pipes, wherein each of said luminous bodies is connected with at least two of said light pipes and said at least two light pipes connected said luminous body to said lantern cover,
    wherein the light radiated from said luminous bodies is guided by said light pipes to a location on said lantern cover.

10. The vehicular lantern of claim 9, wherein said base is a circuit board used to provide a power to said luminous bodies.

11. The vehicular lantern of claim 9, wherein the material of said light pipes is resin.

12. The vehicular lantern of claim 9, wherein said light pipes have a constant diameter.

13. The vehicular lantern of claim 9, wherein the diameter of the two ends of said light pipes are different.

14. The vehicular lantern of claim 9, wherein the path of said light pipes is curved.

15. The vehicular lantern of claim 9, wherein said light pipes and said lantern cover are formed as one piece.

* * * * *